Sept. 14, 1965  F. L. CALIFANO ETAL  3,205,794
SHINGLE STACKING AND SQUARING
Filed April 15, 1963  14 Sheets-Sheet 4

INVENTORS
FRANK L. CALIFANO
PAUL N. SHUTAK
BY
ATTORNEY

INVENTORS
FRANK L. CALIFANO
PAUL N. SHUTAK
BY
ATTORNEY

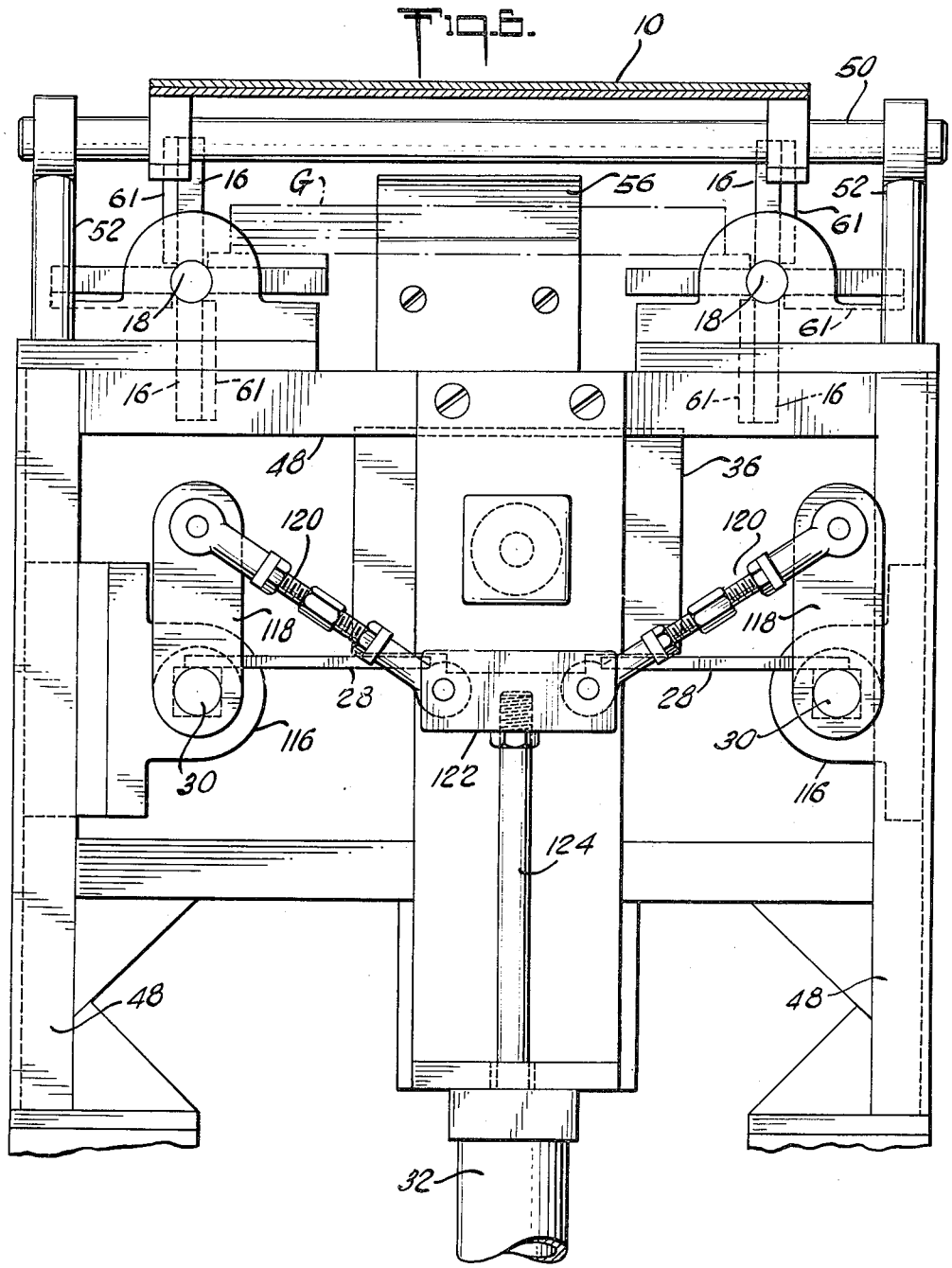

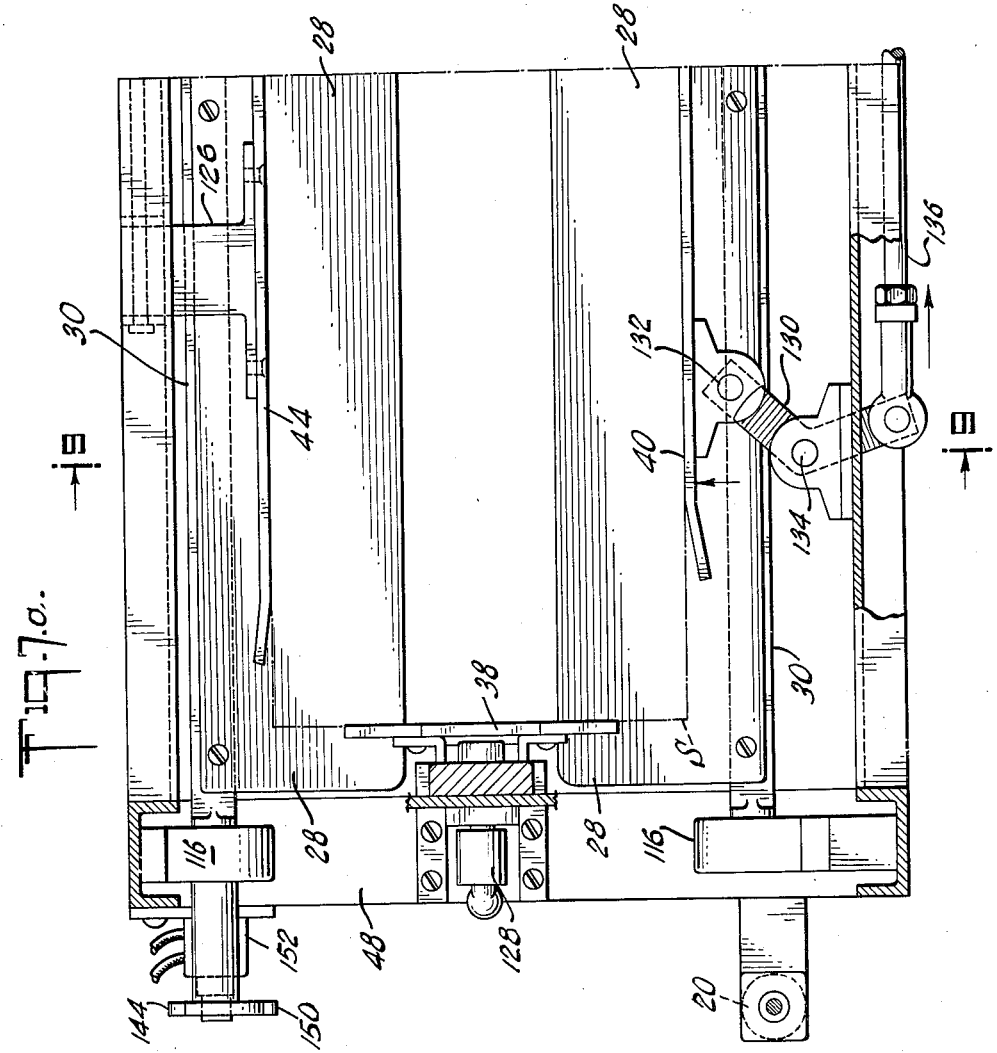

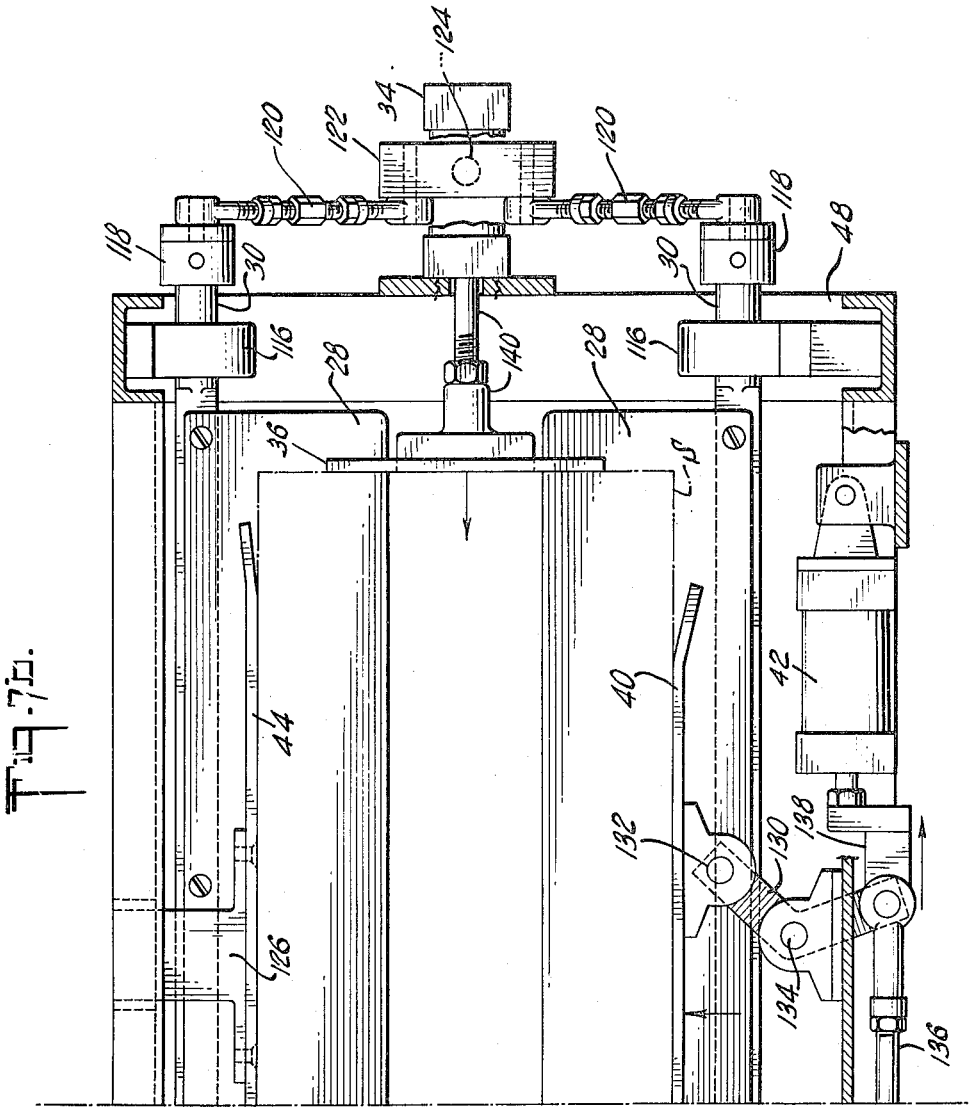
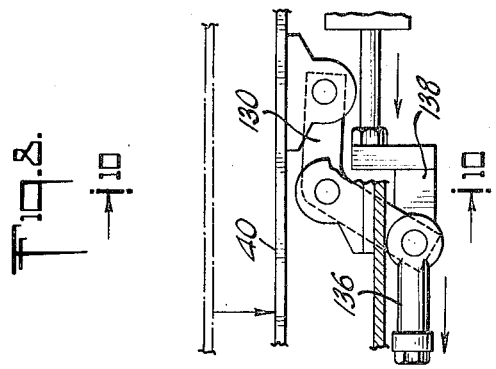

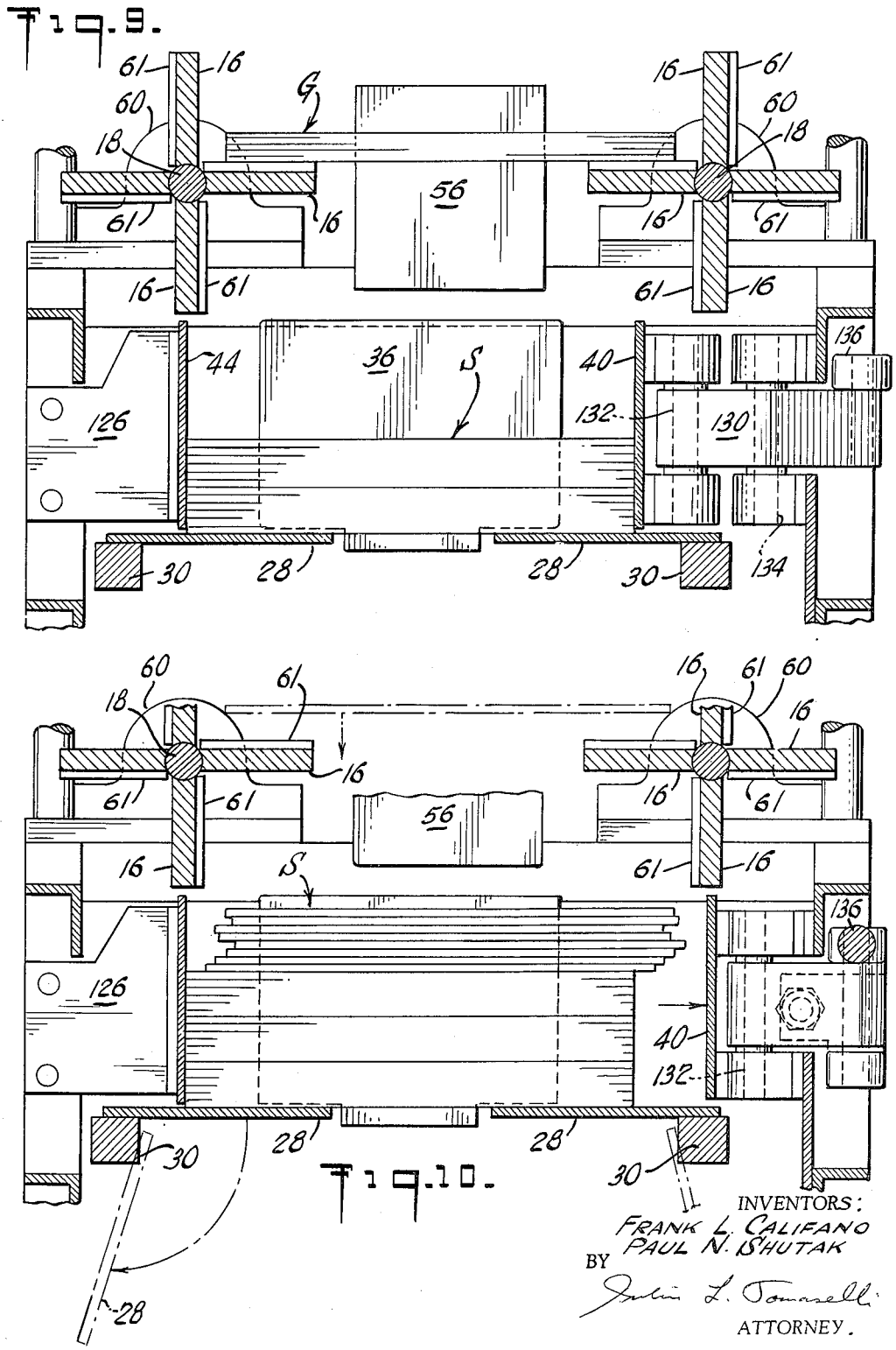

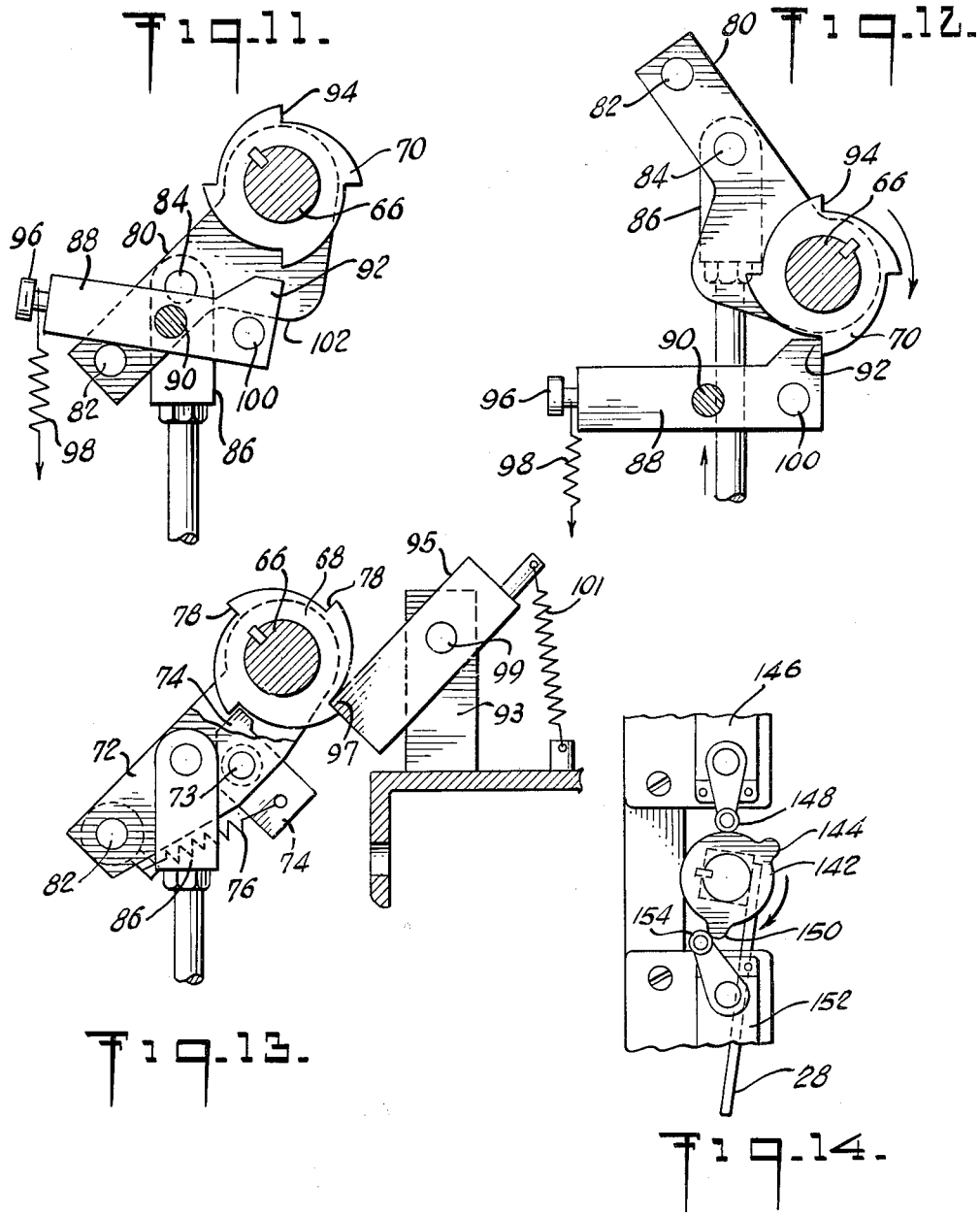

Sept. 14, 1965  F. L. CALIFANO ETAL  3,205,794
SHINGLE STACKING AND SQUARING
Filed April 15, 1963  14 Sheets-Sheet 11

INVENTORS
FRANK L. CALIFANO
PAUL N. SHUTAK
BY
ATTORNEY

Sept. 14, 1965  F. L. CALIFANO ETAL  3,205,794
SHINGLE STACKING AND SQUARING
Filed April 15, 1963  14 Sheets-Sheet 14

INVENTORS
FRANK L. CALIFANO
PAUL N. SHUTAK
BY
ATTORNEY 3,205,794
SHINGLE STACKING AND SQUARING
Frank L. Califano, Hackensack, and Paul N. Shutak, Kearny, N.J., assignors to The Flintkote Company, New York, N.Y., a corporation of Massachusetts
Filed Apr. 15, 1963, Ser. No. 273,168
24 Claims. (Cl. 93—93)

This invention relates to apparatus which is specially adapted to receive freshly made shingles delivered rapidly in succession and automatically stack them in neatly squared bundles without inflicting any damage to the shingles.

The particular types of shingles to which this invention pertains are those in which a base material is impregnated with a bituminous material and coated with weather-resistant granules. These shingles generally are manufactured continuously at a high production rate by fully automated equipment, and the condition of shingles as they emerge therefrom poses various problems which provide background for the present invention. The felt or base material commonly is produced from the pulp of paper, rags or the like, and when this highly absorptive material is combined with liquid asphalt, for example, it becomes a highly deformable and flexible mass. On one side of the soft base material is a layer of embedded mineral granules which can be easily dislodged and which present a very coarse surface. Thick butt shingles typically are marketed in standard bundles of 20, 26 and 28 shingles per bundle and must be stacked in neatly correct numbers in pace with their rapid delivery from the shingle-producing machinery. However, because of the aforementioned sensitive characteristics of these freshly made shingles, prior attempts to develop automatic machinery for this purpose have been largely unsuccessful and manufacturers have, therefore, been forced to employ considerable labor crews solely for the manual stacking of shingles. The principal difficulty has been that in the squaring operation, after the full number of shingles in a bundle has been collected in superposed relation, due to the combined factors of weight and coarseness there is great frictional force imposing resistance to relative shifting of shingles as may be necessary to bring their edges into alignment. Thus, it being recalled that these shingles are still soft and their granules only loosely held, the net result of squaring entire bundles in this fashion has inevitably rendered the shingles virtually unsaleable due to damage in the form of edge disfigurement, tearing of the tabs, loosening of granules, and marring of the shingle faces.

In addition to the problem of avoiding damage to shingles, other considerations are involved in their stacking, squaring and subsequent handling. If shingles are sold in bundles of different sizes (three bundles of 26, 26 and 28 thick butt shingles, for examples, totaling 80 shingles or a "square" of 100 square feet being typical in this case), there is imposed the requirement that the machinery employed must be capable of automatically forming bundles in variable sizes. Another important consideration is that the machinary must be sufficiently rapid in operation that it does not interfere with the production rate of the shingle-making equipment. Finally, the machinery for performing the stacking and squaring must be of cheap, simple, rugged and dependable construction to the end that costly shutdowns for repair will be avoided and also because in a large plant a substantial number of these units is needed to accommodate the several production lines.

Accordingly, it is the main object of this invention to overcome generally the problems that have been discussed above. In particular, it is an object to provide apparatus which is capable of rapidly forming bundles of shingles immediately after they are made, but without the attendant damage effects that have been characteristic of prior art arrangements. It is a further object to provide apparatus which can effect the counting and stacking of different fixed numbers of shingles in each bundle automatically on successive cycles of operation. And, of course, it is desired to accomplish these results in apparatus which is of feasible, simple construction.

In accordance with this invention the above objects are attained by completely avoiding any attempt to square an entire bundle of stacked shingles in a single operation. Instead, only a small number of shingles, say between four and eight, is squared as a group at one time. The greatest frictional resistance to shifting of the shingles in a group into alignment is proportional to the number of shingles in that group or to the total weight thereof, and by a multiple-step squaring of these much smaller groups the frictional resistance also is smaller in direct proportion. However, from this proportional decrease in frictional resistance, there follows a more than proportional drop in the incidence of damage to shingles. In the physical embodiment of the invention disclosed herein, these small groups of shingles are subjected to a squaring operation at intervals as they accumulate successively on the larger stack which is being built up to the desired quantity in a full bundle. Thus the force exerted between the squaring mechanism and the edges of the shingles is not so great as to disfigure them, and the rubbing action between the faces of the shingles is not sufficiently severe to dislodge the granules or otherwise ruin the surface. Also, the tendency of the tabs to tear under stress of squaring is minimized.

Briefly, the specific apparatus comprises the combination of a squaring mechanism and a grouping mechanism. The squaring mechanism is adapted to receive small groups of shingles deposited thereon, one on top of the other, and to effect a lateral alignment or squaring operation on each of these groups as it is deposited on top of the pile. The aforesaid grouping mechanism incorporates movable shelf-like members adapted to receive shingles stacked thereon individually, and means responsive to the accumulation of a predetermined number or group of shingles to cause these members to deposit them in the squaring mechanism. When a number of these smaller groups sufficient to make up a full bundle has accumulated and been squared in the latter mechanism, this bundle is removed automatically and a new cycle of operation begins.

In carrying out this invention a particularly significant aspect is the control means employed for the counting of shingles and to effect a program of operation whereby the variable numbers of shingles assembled as the small groups prior to squaring and in the finished bundle are controlled automatically.

Further details, features, objects and advantages of this invention will become evident from the following description thereof when read in conjunction with the accompanying drawings, in which.

Figure 3:
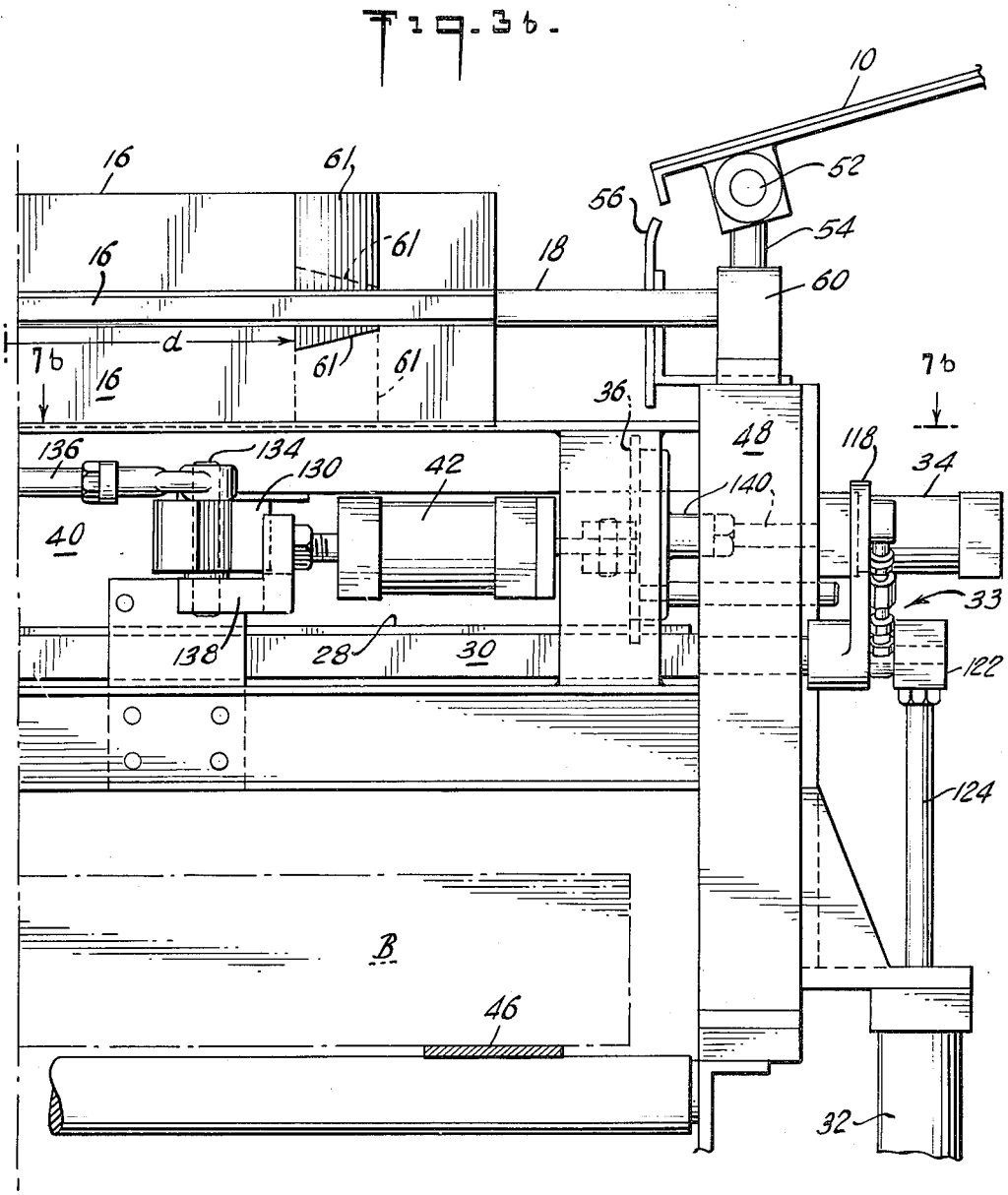
Figure 4:
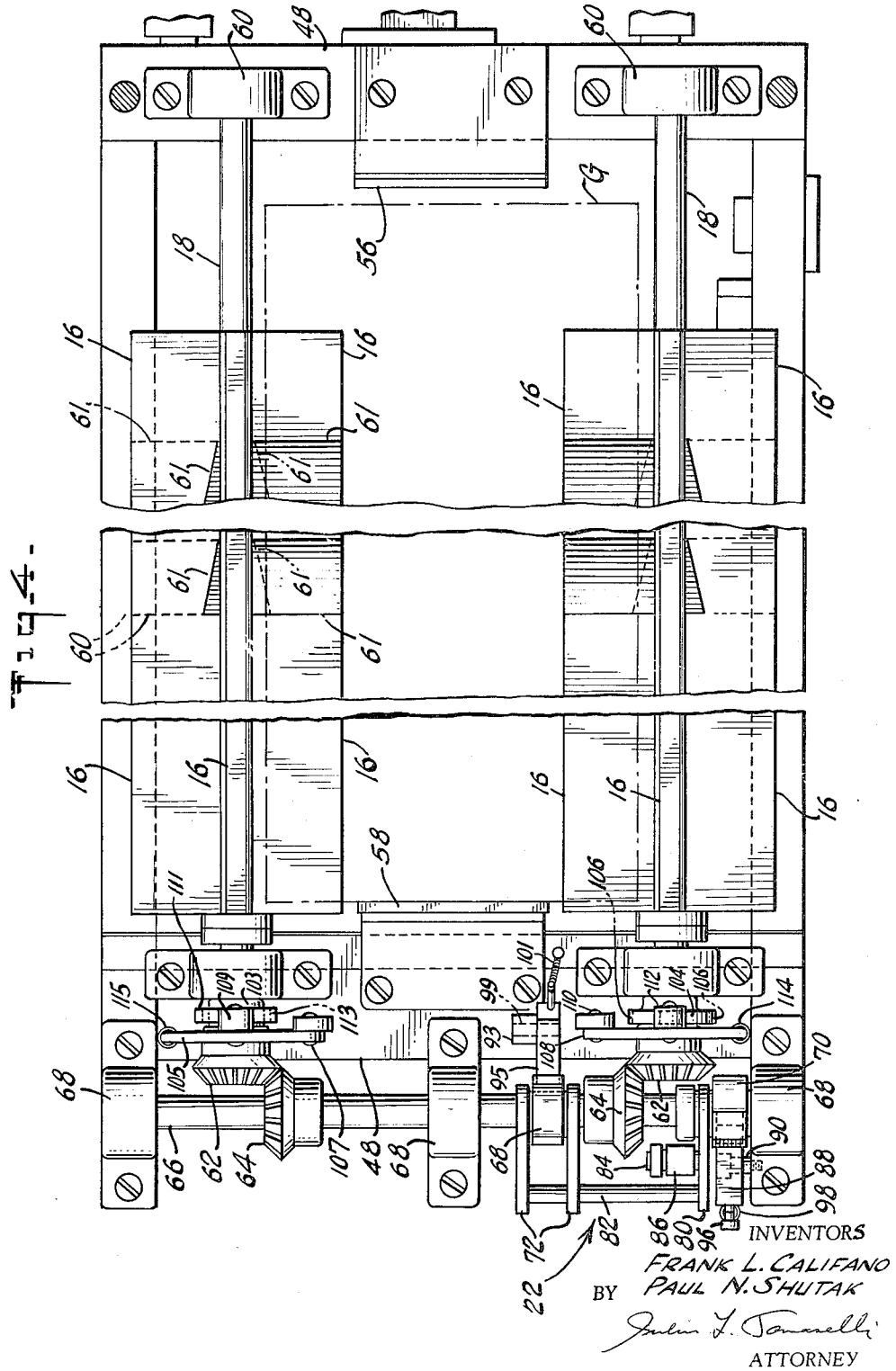
Figure 5:
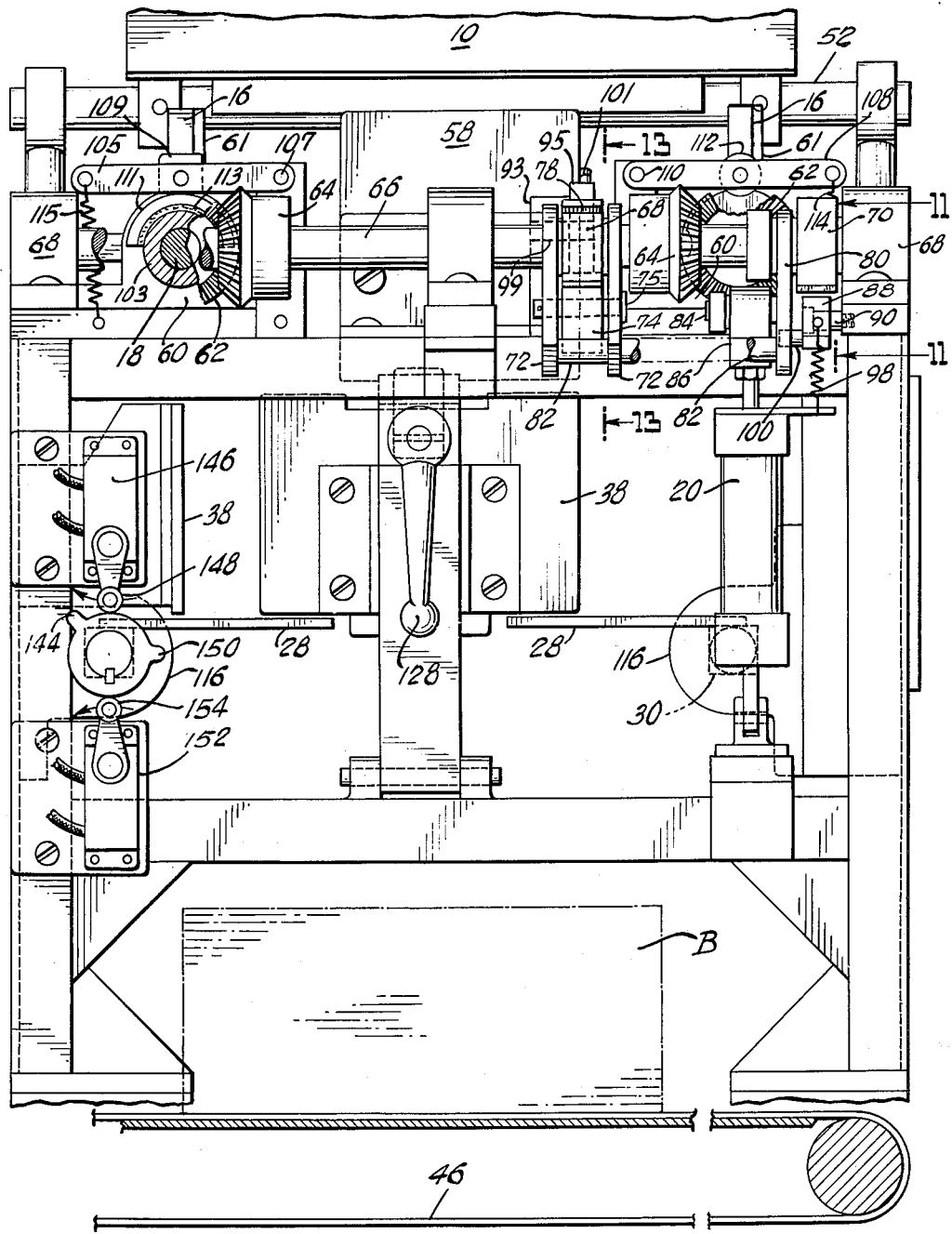

FIGURES 3a and 3b together constitute a view in elevation of the forward side of the apparatus which includes the side shingle squaring pusher plate;

FIGURE 4 is a plan view of this apparatus;

FIGURE 5 is a view in elevation of the left end of the apparatus;

FIGURE 6 is a view in elevation of the right end of the apparatus;

FIGURES 7a and 7b together constitute a plan view or horizontal section taken at a level as indicated by lines 7a—7a and 7b—7b in FIGURES 3a and 3b;

FIGURE 8 is a plan view showing the linkage for moving the side shingle squaring pusher plate when the same is in its outer position.

FIGURE 9 is a transverse vertical section taken as indicated by line 9—9 in FIGURE 7a, with the side pusher plate in its inner squaring position and a group of shingles about to be dropped into the squaring mechanism.

FIGURE 10 is a transverse vertical section also taken along line 9—9 in FIGURE 7a, but indicating the condition of the apparatus immediately following the dropping of the group of shingles into the squaring mechanism;

FIGURE 11 is a vertical section taken as indicated by line 11—11 in FIGURE 5, and showing the reverse motion-limiting pawl and ratchet mechanism in its rest position.

Figure 15:
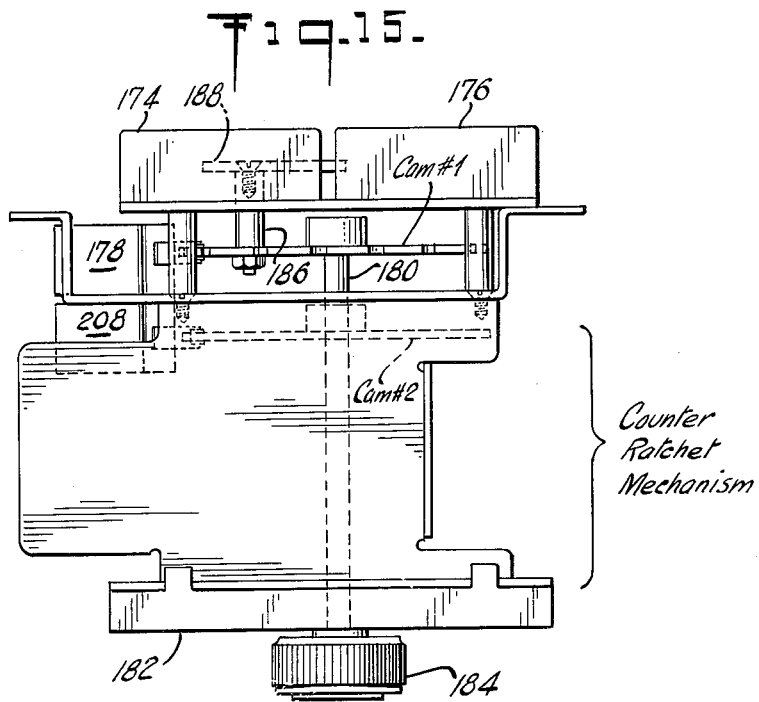
Figure 16:
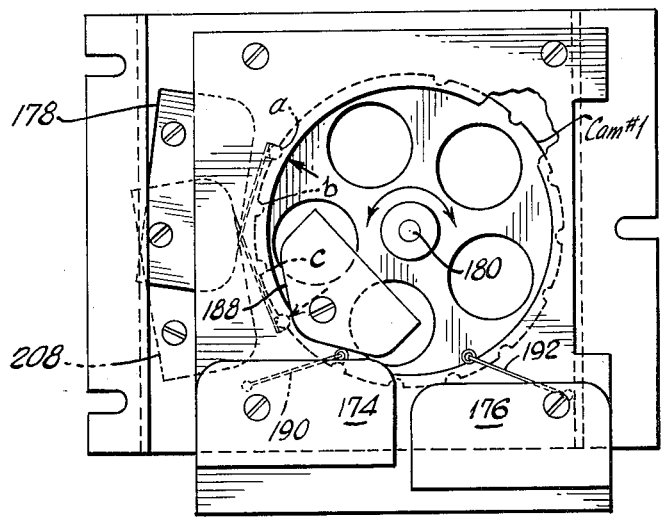
Figure 17:
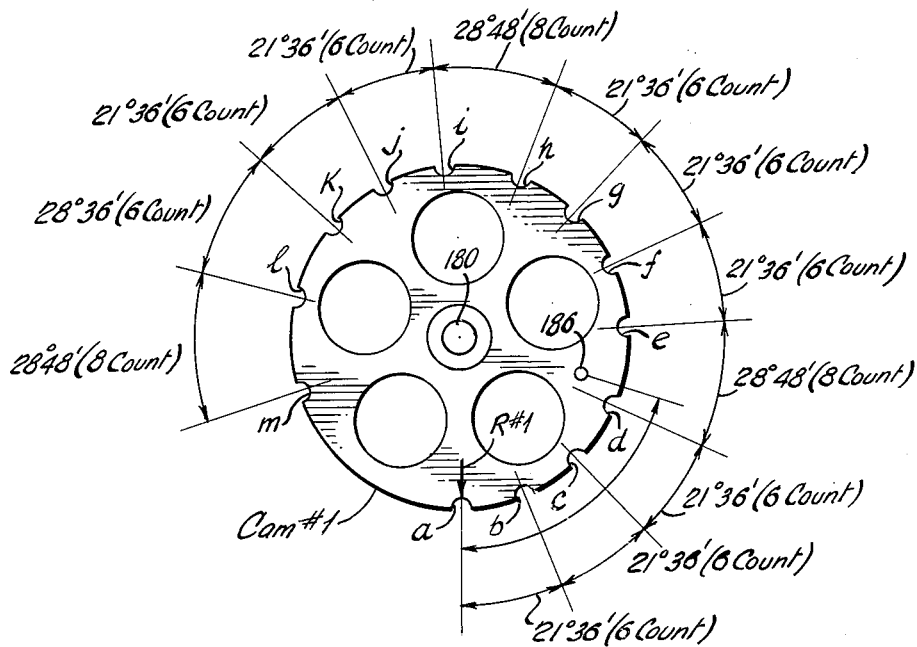
Figure 18:
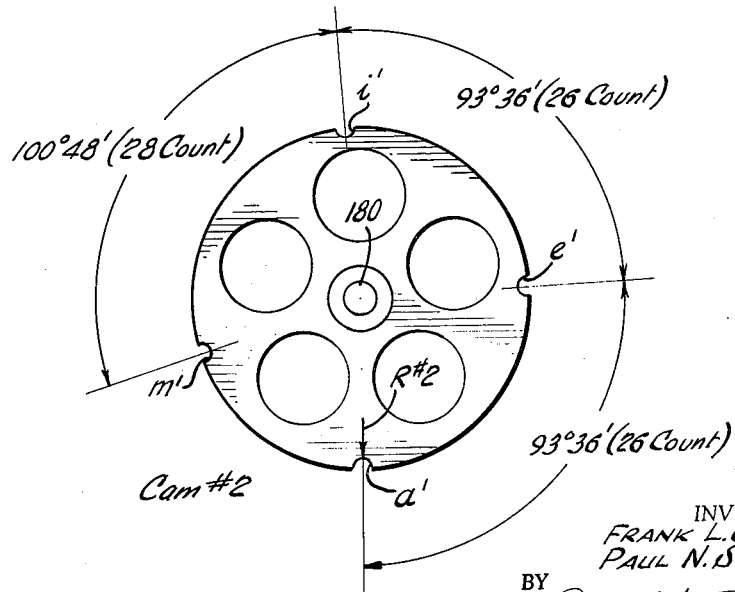
Figure 19:
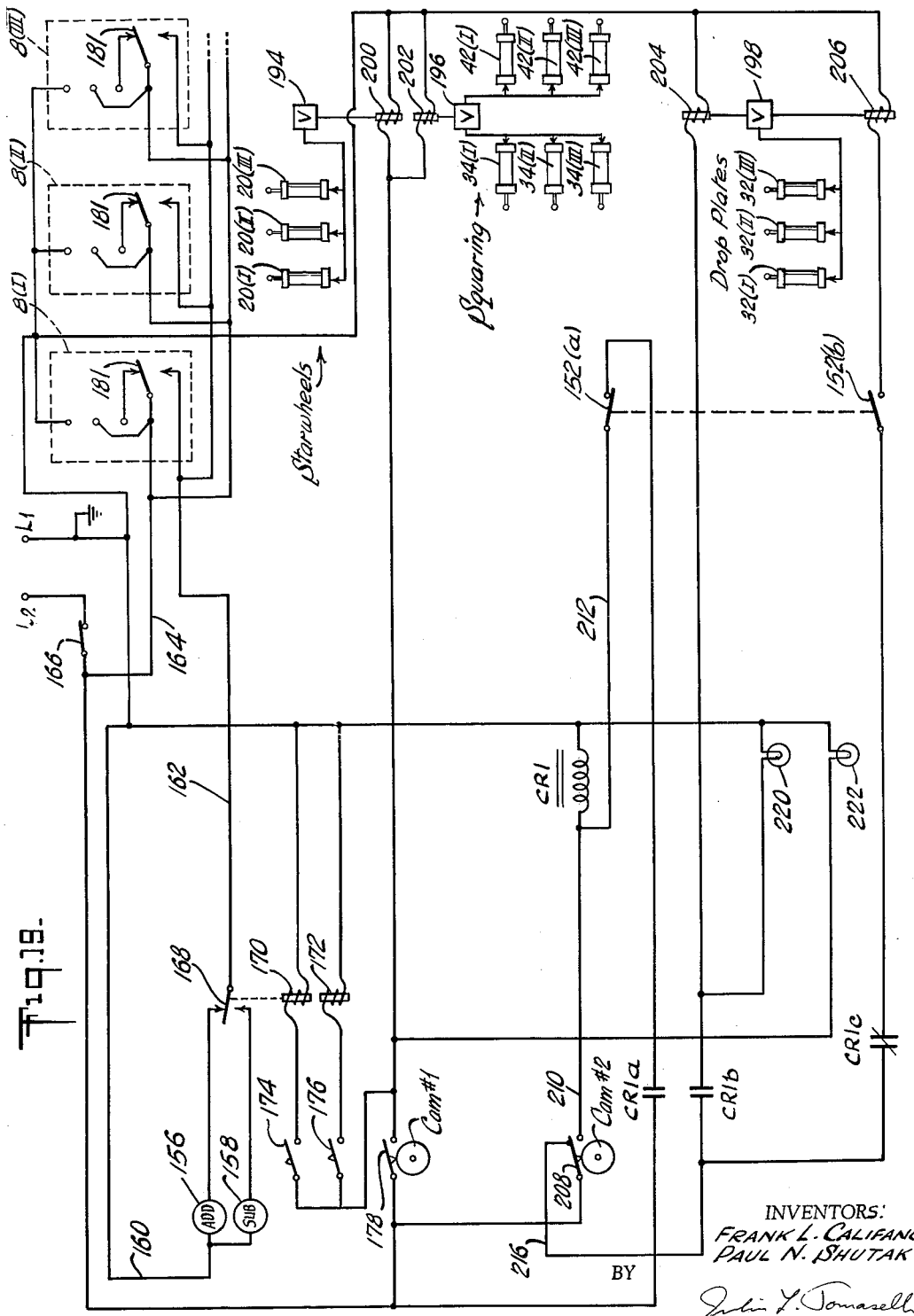

FIGURE 12 is a section the same as FIGURE 11, but showing the pawl and ratchet mechanism at the end of a single indexing operation;

FIGURE 13 is a cross-sectional view taken as indicated by lines 13—13 in FIGURE 5, and showing the driving ratchet arrangement;

FIGURE 14 is a drawing of the switch operating mechanism associated with the stack supporting plates;

FIGURE 15 is a top or side view of the counter employed in the control circuit;

FIGURE 16 is a view of the back of the counter shown in FIGURE 15;

FIGURE 17 is a face view of the switch-operating cam which effects a sensing of the completion of delivery of each consecutive group and initiates the transfer thereof to the squaring mechanism;

FIGURE 18 is a face view of the switch-operating cam which effects the sensing of completion of delivery of a desired number of groups to the stacking mechanism, and initiates removal of the completed overall stack therefrom;

FIGURE 19 is a wiring diagram of the control circuit employed.

Figure 20:
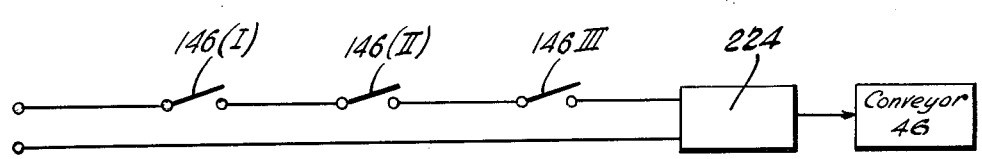

FIGURE 20 is a schematic illustration of the control exerted jointly by the plural stacking units over operation of common conveyor for removing completed bundles.

Figure 21:
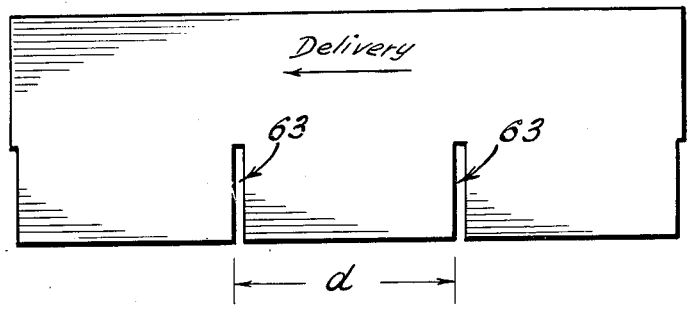

FIGURE 21 is a drawing of the outline of a shingle of the type which the presently described apparatus is adapted to handle.

Figure 22:
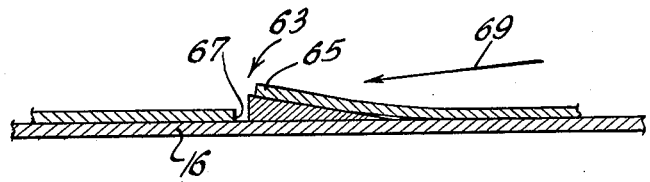

FIGURE 22 is a cross-section view serving to illustrate the function of wedge-shaped elements engageable with the tabs of shingles supported in the grouping mechanism.

Figure 1:
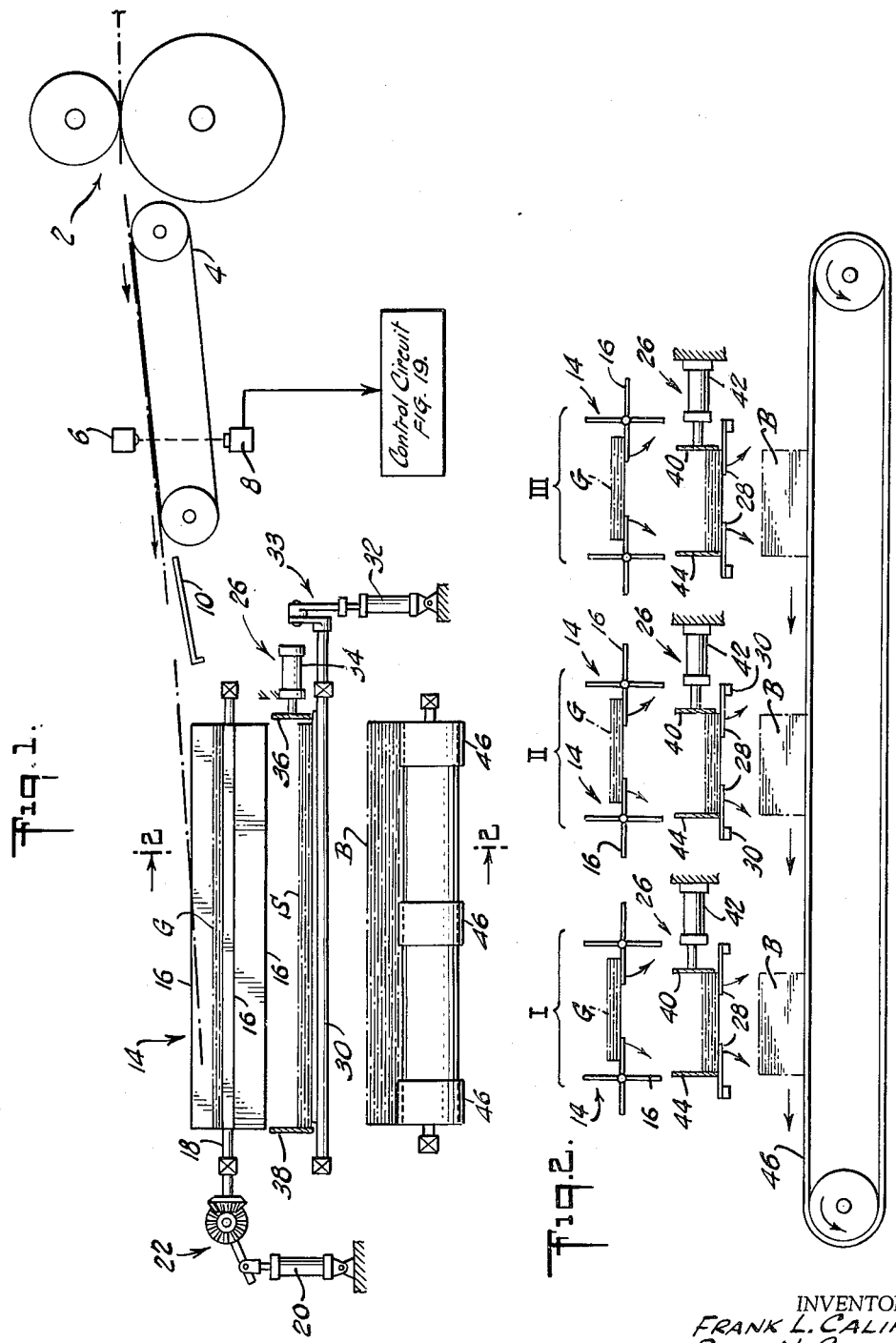
FIGURE 1 is a schematic illustration of shingle stacking and squaring apparatus constructed in accordance with this invention, as viewed from one side thereof.
Figure 2:
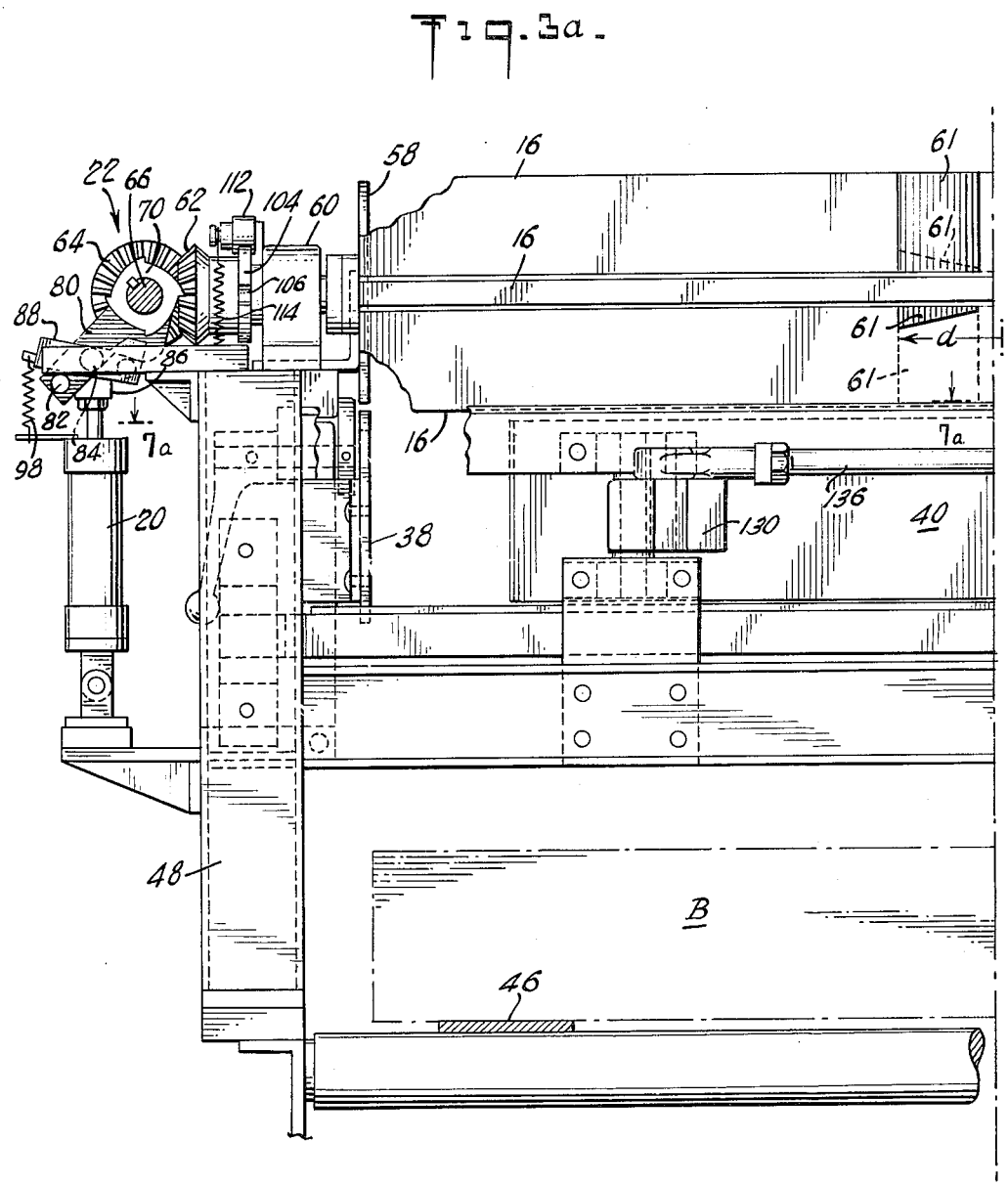
FIGURE 2 is a schematic illustration of the apparatus as viewed in cross-section along lines 2—2 in FIGURE 1, and serving also to illustrate the arrangement of a plurality of such units in parrallel operation.

Preliminary to the detailed description of the invention supplied hereafter, a brief reference to FIGURES 1 and 2 will provide a broad summary of the arrangement and operation of the parts employed. Shingles are delivered from a cutter 2, which severs the lengths of shingles and forms the tab-defining slits therein, and are deposited on a belt conveyor 4 which is driven at a speed slightly in excess of delivery speed of cutter 2, whereby leading shingles are accelerated relative to trailing shingles to establish a spacing therebetween. At a fixed point along the path of travel of shingles on belt conveyor 4 there is provided a sensing means in the form of a light source 6 and a photorelay 8 which is coupled to supply input signals to a control circuit which will be described hereafter with reference to FIGURE 19 in particular. As each shingle passes this point it momentarily interrupts the transmission of light from source 6 to photorelay 8, which then responsively transmits to the control circuit (FIGURE 19) a signal indicating a count of one shingle. Shingles then proceed across an adjustable ramp or guide plate 10 and into a group-assembling and transfer section which is generally designated 14. Section 14 comprises principally a pair of elements which, for lack of a better term, will be referred to herein as the "starwheels" 16. Each starwheel 16 is in the form of a plurality of shingle supporting flights or shelves extending radially from and in alignment with a central hub provided by a shaft 18. (Although four shelves are associated with each shaft 18 in the embodiment described, other numbers, such as two or three shelves, can be associated with each such shaft with appropriate modifications in the machine controls.) The indexing movements of shafts 18 are effected by a fluid-operated piston and cylinder unit 20 working through means of a mechanism generally indicated at 22, and which will be described more fully hereafter.

The function of each group-assembling and transfer section 14 is to receive and support shingles delivered at high speed from conveyor 4 and, in response to a signal indicating that a group of predetermined number has been received, to transfer this group to a stack assembling and squaring section which is generally indicated at 26. As evident in FIGURE 2, each such "group," prior to transfer of section 26, is designated "G" and will be so referred to throughout this description. Section 26 includes a pair of drop leaves or plates 28 which extend from their respective supporting and driving shafts 30, the rotation of these shafts being operable to move the plates 28 between a horizontal stack-supporting position and a substantially vertical position wherein a stack of shingles is dropped. The driving of shafts 30 to effect these movements is accomplished by a fluid-operated piston and cylinder unit 32 which works through linkage generally indicated at 33 and described hereafter. The squaring of a stack, which is identified herein by the letter "S," involves both an endwise and a sidewise alignment of the edges of shingles. This "endwise" squaring, or the bringing of the ends into alignment, is effected by a pusher plate 36, operated by a fluid-operated piston and cylinder unit 34, acting in conjunction with a fixed abutment 38 at the opposite end of the stack S. The "sidewise" squaring of the stack S, or the bringing of the side edges of shingles into alignment, is effected by a pusher plate 40, moved laterally by a fluid-operated piston and cylinder unit 42, acting in conjunction with a fixed abutment 44 extending along the length of the opposite side of the stack S.

Directly beneath the stack assembling and squaring section 26, and extending transverse thereto, is a conveyor 46 for moving completed stacks that will be loosely referred to as "bundles," which are identified by the letter "B" in FIGURES 1 and 2.

As previously explained, the operation of the group assembling and transfer section 14 is such that it awaits the delivery of a predetermined, counted number of shingles constituting a desired "group" G and then transfers this group to the stack assembling and squaring section 26. Upon the transfer of each group G to section 26, in response to the control circuit described hereafter, the pressure plate 36 and 40 are moved inwardly to effect endwise and sidewise squaring of only that part of the stack S which constitutes the newly deposited group G. After a predetermined number of groups G has been transferred to section 26, each such transfer being followed by a squaring operation as aforedescribed, in response to a signal from the control circuit the plates 28 are moved from their horizontal to their substantially vertical positions to effect a dropping of the shingles as a completed bundle B onto the conveyor 46, which removes a plurality of the bundles B and delivers them to suitable equipment for the packaging and other handling thereof.

The mention of a plurality of completed bundles B leads to consideration of the fact that a plurality of identical units, each comprising sections 14 and 26, are arranged in side-by-side relation as illustrated in FIGURE 2. Preferably three such units, which are identified I, II and III, are arranged to handle the shingles received from three lanes of a single production line. The units I, II and III perform simultaneous and identical operations on each complete cycle of operation, although as described hereafter the operation of the machine can be so programmed that on successive cycles of operation bundles of different sizes will be formed. For example, the three units can be made to turn out three bundles of 28 shingles each on one cycle of operation, and to turn out three bundles of 26 shingles each on the next one or two cycles of operation.

Having generally described the overall arrangement and operation of the apparatus, the parts which make up the mechanical portion of each of the identical units I, II and III will now be described in greater detail through reference to FIGURES 3 through 13.

The machine has a main structural framework 48. The ramp or guideplate 10, previously mentioned, is affixed to a crossrod 52 which is adjustably mounted in support members 54 projecting from framework 48. Directly beneath the lower lip of plate 10 is an upstanding stop member 56 for eliminating any rearward movement of shingles that might occur, and for guiding them downwardly in the course of transfer to the stack assembling and squaring section 26. At the forward end of the starwheels 16, there is a fixed, upstanding stop member 58 for halting the forward motion of shingles as they are delivered at high speed from conveyor 4 and for guiding them in the course of their downward transfer.

As previously mentioned, each starwheel 16 comprises a plurality of flights or shelves extending radially from and in alignment with a common axis or hub, which in the present case is the shaft 18. These shelves are evenly spaced circumferentially, preferably at greater than 90°. Although circumferential spacings of 180° (with two shelves) or 120° (with three shelves) can be employed, the smaller circumferential spacing of 90° is preferable because, while a group of shingles is being transferred downwardly through rotation of the star wheels, the next empty shelf can be more quickly rotated into position to receive the shingles rapidly following from the delivery conveyor 4.

A significant feature is the provision of a pair of wedge-shaped elements 61 on each shelf or flight of each starwheel 16. As shown in FIGURE 21, which represents the outline of a conventional rectangular shingle, the slits 63 which define the shingle tabs are spaced by a distance $d$ and, referring to FIGURES 3a and 3b together, the elements 61 have this same spacing $d$. Each element 61 has a ramp inclined upwardly in the direction of delivery of shingles, and then abruptly receding vertically. The function of each element 61 will be evident from FIGURE 22. The bottom shingle of each group G is caused to come to rest with each slit 63 approximately in vertical alignment with the edge of an element 61, which causes the rearwardly facing edge 67 of the slit to be below the raised rearward tab 65. The overall effect of this is, that as a succeeding shingle is delivered along a path indicated by arrow 69, the forward edge thereof cannot collide with this rearwardly facing edge 67 of the previously delivered shingle. Instead, this succeeding shingle will be caused to glance across the raised tab 65 without interference by any engagement with edge 67. Such engagement would prematurely halt the forward motion of the delivered shingles and they would not then fall as is desired in making up a group G.

Each shaft 18 is freely journaled in bearings 60 mounted on framework 48, and at its forward end has affixed a bevel gear 62 which meshes with a bevel gear 64 keyed to a shaft 66 that is journaled in bearings 68. The mechanism, generally indicated at 22, for intermittently indexing starwheels 16 through means of shaft 66 will now be described. On shaft 66 there are keyed a driving ratchet 68 and a motion-limiting ratchet 70. Two spaced arms 72 are freely pivoted on shaft 66 and carry between them a pawl 74, the pawl 74 being freely pivoted on a pin 73 extending between these arms, and a tension spring 76 serves to urge the pawl 74 into engagement with the driving ratchet 68. These parts are shown in FIGURE 13 in their starting or rest positions, and if arms 72 are driven in a clockwise direction the pawl 74 will engage beneath one of the teeth 78 on ratchet 68 and thereby rotate the shaft 66. An arm 80 also is freely pivoted on shaft 66, and crossrods 82 and 84 extend between arm 80 and arms 72. A fitting 86 on the piston rod of fluid-operated unit 20 is connected to crossrod 84.

A latch 88 is pivotally mounted on a stud 90 on the fixed machine framework, and has a nose portion 92 adapted to engage one of the teeth 94 on ratchet 70 and thereby limit its clockwise rotation (FIGURES 11 and 12). Latch 88 is urged in a direction to bring nose portion 92 into engagement with ratchet 70 by means of a tension spring 98 connected between the machine frame and a stud 96. The arm 80, however, has a cam portion 102 which is adapted to engage a pin 100 extending inwardly from latch 88, and when arm 80 is in the rest position shown in FIGURE 11 the engagement of pin 100 by cam portion 102 serves to hold latch nose portion 92 out of engagement with ratchet 70. Upon movement of arm 80 from its FIGURE 11 position toward the position shown in FIGURE 12, however, the latch 88 is released for movement of nose portion 92 into the range of engagements with a tooth 94 on ratchet 70. Thus, the operation of fluid-operated piston and cylinder unit 20 to drive shaft 66 in a clockwise direction through means of pawl 74 and ratchet 68 cannot be effective to drive shaft 66 through more than 90°, because upon the initiation of such rotation the latch 88 is moved by spring 98 into position to encounter the next ratchet tooth 94 at the end of 90° of rotation. It should be noted that after arms 72 and 80 have been returned to their starting position (FIGURES 11 and 13), the cam portion 102 again engages pin 100 and thereby urges nose portion 92 away from the tooth 94 that it has just engaged. The ratchet 70 then is released so that shaft 66 again can be rotated through 90° in a repetition of the cycle of operation of pawl 74 and driving ratchet 68.

While the latch 88 limits to 90° the extent of clockwise or forward driving rotation of shaft 66 on each operating stroke, a latch 95 is provided to limit reverse rotation of shaft 66 in a counterclockwise direction (FIGURE 13). Latch 95 has a nose portion 97 which is adapted to ride across the teeth 78 of ratchet 68 and, as each tooth 78 passes it, to drop behind the tooth and prohibit reverse movement of the ratchet. Latch 95 is pivotally mounted at 99 on a bracket 93 secured to the machine framework and is yieldably urged into engagement with ratchet 68 by means of a tension spring 101.

As shingles are deposited on the starwheels 16, the accumulated weight becomes considerable and means are provided to restrain the rotation of starwheels under the influence of this weight, it being evident that this would involve a clockwise rotation (FIGURES 11, 12 and 13) of shaft 66. The latch 88 does not restrain such rotation because normally it is in a rest position of disengagement from ratchet 70. Referring to FIGURES 3a, 4 and 5, shaft 18 of one of the starwheels 16 is provided with a disc 104 having depressions 106 corresponding in number to the number of shelves on each starwheel 16. A lever 108 which is pivotally fulcrumed on the frame at 110 carries a roller 112 which is adapted to drop into one of the depressions 106, and has its free end resiliently biased downwardly by a tension spring 114. This mechanism serves to restrain both starwheels 16 in any of the four rest positions, and also to stop them in the proper rest position following each indexing stroke of the piston and cylinder unit 20. It may be noted that the beginning of each such stroke initiates the lifting of roller 112 out of a depression 106 and rotation of the starwheels. The inertia of these starwheels plus the weight of a group G of shingles thereon will tend to continue this rotational indexing until the roller 112 again falls into one of the depressions 106.

As a further expedient effecting a braking action on the starwheels 16, there is provided a lever 105 which is pivoted on the frame at 107. Lever 105 is connected to a member 109 which carries a rigid semicircular yoke that has a brake lining 113 bonded or otherwise fastened to its inner surface. A tension spring 115 urges the free end of lever 105 downwardly, and thereby presses brake lining 113 against a portion 103 of the shaft assembly which serves as a brake drum. Thus, it will be seen that this brake mechanism supplements the action of the roller 112 and disc 108, though it has the added advantage that it effects a braking action throughout each 90° rotational indexing of the starwheels, whereas roller 112 and disc 106 are effective only at the beginning and end of this rotation.

Referring now to FIGURE 6 in particular, each of the shafts 30, on which the drop leaves or plates 28 are mounted, is freely journaled in bearings 116 mounted on the machine framework. Affixed to the rearward end of each shaft 30 is a crank arm 118, and a link 120 connects each arm 118 to a head 122 attached to the piston rod 124 of fluid-operated unit 32. In FIGURE 6 these parts are shown in their normal or rest position wherein the plates 28 are horizontally oriented to support a stack S of shingles. In response to a signal generated by the control circuit described hereafter, the piston and cylinder unit 32 is caused to lower the head 122 and thereby rotate the shafts 30 in a direction to lower plates 28 to a substantially vertical position, thereby dropping a stack S onto the conveyer 46.

The stationary abutment 44 extending along one side of the stack assembling and squaring section 26 is secured to the machine framework by brackets 126. The fixed abutment 38 at the rearward end of this section is pivotally mounted and latched by means including a handle 128 whereby the abutment 38 can be moved outwardly in the nature of a door. The pusher plate 40 is pivoted at 132 to a pair of bell crank levers 130 which are intermediately on the machine framework at 134. Translatory movement of pusher plate 40 is coordinated by a connecting rod 136 between bell crank levers 130, and the rod 130 is operably connected to a fixture 138 on the piston rod of fluid-operated unit 42. The normal position of pusher plate 40 is illustrated in FIGURES 7a and 7b, the unit 42 then being under pressure, and in response to a signal generated from the control circuit described hereafter the piston and cylinder unit 42 operates connecting rod 136 and bell crank levers 130 in a direction to move the pusher plate outwardly to the position illustrated in FIGURE 8. The pusher plate 36, movable at the rearward end of stack S, is mounted on the piston rod 140 of fluid-operated unit 34. In FIGURES 7a and 7b the pusher plate 36 is shown in its normal extended or inner position, from which it is momentarily withdrawn by unit 34 in response to a signal generated from the control circuit.

On the forward end of one of the shafts 30 there is secured a cam 142 having a first lobe 144 for operating a switch 146 through its cam follower 148, and a second lobe 150 for operating a switch 152 through its cam follower 154. Referring to FIGURE 14, it will be seen that as plates 28 drop from their horizontal position the lobe 144 will pass cam follower 148 and lobe 150 will displace cam follower 154, with consequent operations of switches 146 and 152 as described hereafter.

Before proceeding to a description of the control circuit, a reference to FIGURES 9 and 10 is appropriate to highlight the operation of the pusher plates 36 and 40. In FIGURE 9, a group G of shingles is in the process of being assembled on the starwheels 16, and from the drawing it will be evident that the edges of the shingles in group C are in random or misaligned relation vertically. Meanwhile, the pusher plates 36 and 40 have moved inwardly to square up the stack S that has been assembled on drop plates 28. In FIGURE 10, the pusher plate 40 has been withdrawn, and by operation of the starwheels 16 the group G has been dropped onto stack S. The pusher plates 36 and 40 will again be moved inwardly, but it is important to note that, because of the squaring operation that has just occurred, the pusher plates 36 and 40 will, in effect, operate only to square the small number of shingles constituting the newly deposited group G, as compared to the squaring of an entire stack S in a single operation.

Reference has been made to the "fluid-operated" units 20, 32, 34 and 42. Although pneumatically operating units have been preferred in the actual construction of this machine, it will be understood that either pneumatic or hydraulic units can be used to perform the various operations described herein.

Each of the units I, II and III has its individual arrangement of light source 6 and photorelay 8, and in FIGURE 19 the photorelays of the respective units I, II and III are indicated at 8(I), 8(II) and 8(III). The three photorelays act as inputs to a single counter which will be described with reference to FIGURES 15 to 18 principally. The basic internal actuating mechanism of this counter is conventional and commercially available, and only the switch-actuating cams which influence the forward and reverse behavior of the counter, and determine which output signals are emitted, have been specially developed for the purpose of carrying out this invention. The basic mechanism of a standard counter designated as Model No. HZ200A6, manufactured by the Eagle Signal Company, of Moline, Illinois, has been found to be suitable for this purpose. Top and back views of the chassis of this counter are shown in FIGURES 15 and 16, and FIGURES 17 and 18 are views of the switch-actuating cams of this counter. The counter ratchet mechanism (see FIGURE 15) is of the type wherein a ratchet is advanced a distance representing a count of one upon receiving each discrete electrical pulse as an input representing the single count. In the standard, unmodified counter, the ratchet mechanism advances in an "add" direction from zero through 100 and then can reverse in a "subtract" direction from 100 through zero. Furthermore, if desired, this counter can operate in either the "add" or "subtract" direction at any intermediate stage between zero and 100. (Because this basic internal ratchet mechanism is conventional in the art and has been well identified, it will not be described in detail herein in the interest of brevity of disclosure.) Whether or not the counter operates in one or the other direction is determined by the selective energization of a pair of solenoid-operated units which are indicated at 156 and 158 in FIGURE 19. In the control circuit shown in FIGURE 19, the "add" element 156 and the "sub" element 158 draw their power from input lines, indicated L-1 and L-2, through lines 160, 162 and 164, with the photorelays 8(I), 8(II) and 8(III) being connected in parallel across the lines 162 and 164. A manually operated switch 166 is provided to place the control circuit in the "On" or "Off" state. Whether the counter operates forwardly in the "add" condition from zero toward 100 or in the "sub" condition from 100 back toward zero is determined by the position of a switch 168 which is part of a relay having coils 170 and 172. Relay coil 170 is energized to activate the "add" element 156 upon closure of a cam-operated switch 174, and relay coil 172 is energized to activate the "sub" element 158 by closure of a cam-operated switch 176. (The closure of switches 174 and 176 will cause energization of the respective relay coils 170 and 172 only when concurrent with closure of a cam-operated switch 178, the operation of which will be explained hereafter in due course.) For reasons given hereafter, it is of great significance to note that the counter is conditioned for forward or backward stepping (depending upon whether switch 168 is closed in circuit with element 156 or 158) upon closing of a single switch 181 across lines 162 and 164, but does not actually step until the circuit across lines 162 and 164 has been broken. Thus, when a shingle passes between the light source 6 and photorelay 8 of one of the units I, II, and III, its associated switch 181 will close and reopen, but the counter will not advance or step in a forward or backward direction until the switches 181 of the two other units have reopened after shingles in their respective lanes have passed completely.

Each triggering of a photorelay 8 to effect a closure of its switch 181 represents a pulse or "count" and, referring to FIGURES 15 to 18, each count results in the rotation of a shaft 180. (The counter has a face, generally indicated 182, on which there is a dial, not shown, associated with shaft 180 to give a visual indication of the count, and a manually operable knob 184 is provided for setting of the counter to any desired starting point.) On shaft 180 are two cams which for present purposes are designated cam #1 and cam #2. On a stud 186 extending from cam #1 there is mounted a cam 188 which is adapted to engage and depress the actuating members 190 and 192 of the switches 174 and 176, respectively, which have been previously described as controlling the reversal of the counter through operation of drive units 156 and 158. As the counter mechanism reaches a predetermined limit of rotation in a clockwise direction of rotation (FIGURE 16) the cam 188 will encounter switch actuator 192 and thereby close switch 176 to effect closure of switch 168 with respect to the "sub" unit 158. This will reverse the counter so that on each subsequent pulse it will step in the counterclockwise direction (FIGURE 16) until a limit is reached at which cam 188 will depress switch actuator 190 to effect a movement of switch 168 back to a position to reactivate the "add" drive unit 156. When cam 188 reaches the point of operation of switch 174 the counter may be considered as being at the zero count, and when cam 188 is at the point of operation of switch 176 the counter may be considered as being at the 80-count stage, though actually it is not material whether "zero" is considered at the limit of clockwise or counterclockwise rotation.

For each of the units I, II and III, the fluid-operated piston and cylinder unit 20 for operating the starwheels 16, the units 34 and 42 for operating the pusher plates 36 and 40 and the unit 32 for operating the drop plates 28, are schematically illustrated in FIGURE 19 and these fluid-operated units are controlled, respectively, by solenoid-operated valves 194, 196 and 198. Valve 194 has an operating solenoid 200, the operation being such that when solenoid 200 is energized the piston rod 86 (FIGURES 3a, 5 and 11 to 13) is driven upwardly to effect a 90° indexing of the starwheels 16 of each unit I, II and III, as previously described. Valve 196 has an operating solenoid 202, and upon energization of solenoid 202 the valve 196 causes fluid-operated units 34 and 42 to withdraw the pusher plates 36 and 40 of each of the units I, II and III. Upon de-energization of solenoids 200 and 202 the fluid-operated units 20 will restore the mechanism 22 of each of the units I, II and III (previously described) to its original starting position, and fluid-operated units 34 and 42 will restore the pusher plates 36 and 40 of each of these units to their inner squaring positions as illustrated in FIGURES 7a and 7b. Solenoids 200 and 202 are in series with the cam operated switch 178, previously mentioned, and thus it will be seen that closing this switch momentarily will result in dropping of three groups G by the starwheels 16 of the respective units I, II and III and, simultaneously, the withdrawal of pusher plates 36 and 40 of each of these units from engagement with the three stacks S below the three pairs of starwheels 16. The opening of switch 178 will cause these pusher plates 36 and 40 to move inwardly into engagement with the three newly deposited groups G. The contour of cam #1 serves as a means for programming these operations and will be described in further detail hereafter.

The valve 198 has operating solenoids 204 and 206. When solenoid 204 is energized, the valve 198 will cause the fluid-operated units 32 of all three units I, II and III to lower their respective drop plates 28 through the connecting means 118, 120 and 122 previously described with reference to FIGURE 6. Upon energization of solenoid 206, the valve 198 will cause each of the fluid-operated units 32 simultaneously to restore the drop plates 28 to their horizontal, stack-supporting position through the same connecting means. Solenoid 204 can be energized only through completion of a circuit including the contacts CR1b of a relay CR1, and a switch 208 which is operated by cam #2. A circuit is closed through line 216, contacts CR1b and solenoid 204 only when the lobe of switch 208 is riding high on cam #2, but contacts CR1b initially can be closed only after the dropping of switch 208 to complete a circuit through line 210 and thereby energize relay CR1. Also, a holding circuit is then established through line 212 and holding contacts CR1a. In operation, switch 208 normally is in the position shown. If switch 208 momentarily is operated by cam #2 to energize relay CR1 through line 210, contacts CR1a and CR1b will close and normally closed relay contacts CR1c will fall open. Even thought contacts CR1b are now closed, solenoid 204 will not be energized, thereby to effect lowering of the drop plates 28, until switch 208 has been restored to contact with line 216. This operation will not automatically cause relay CR1 to drop out. Referring back to FIGURE 14, it will be recalled that a switch 152 is operated when the drop plates 28 have arrived at their lowermost position. This switch 152 has contacts 152(a) (which are normally closed because the drop plates 28 normally are in their horizontal or upper position) and normally open contacts 152(b). When the drop plates 28 arrive at this lowermost position, the switch or contacts 152(a) open to drop out the holding circuit through contacts CR1a, permitting contacts CR1c to close and contacts 152(b) are closed to complete a circuit through solenoid 206. As previously mentioned, the energization of solenoid 206 results in operation of valve 198 to restore the drop plates 28 of all units I, II and III to their horizontal or upper position wherein they are capable of supporting stacks S.

Pilot lights 220 and 222 are shown in FIGURE 19. Pilot light 220 is in series with the relay contacts CR1b, which are closed and conducting only when solenoid 204 is energized and drop plates 28 are lowered. Thus, pilot light 220 will light up when the drop plates 28 are down. Pilot light 222 is connected in series with cam-operated switch 178, which is closed only when the starwheels 16 are being indexed 90° and the squaring pusher plates 36 and 40 are being withdrawn, at which time pilot light 222 will be illuminated.

With the operation of the cam-operated switches 178 and 208 having been described, the design of cams #1 and #2 will now be described. Upon the completed triggering of all three photorelays 8, representing a count of one shingle in each lane of the units I, II and III, the counter ratchet mechanism (FIGURE 15) steps shaft 180 in either a forward or reverse direction (depending upon the selection of counter drive units 156 and 158 through operation of switch 168) by the amount of 3°36′ (three degrees and thirty-six minutes). Cam #1 has a reference mark indicated R#1 and cam #2 has a reference mark indicated R#2. As seen in FIGURE 16, in securing these cams to shaft 180 the depression (a) opposite mark R#1 is set to engage the actuator of switch 178 at the same stage of rotation that the depression (a′) opposite mark R#2 engages the actuator of switch 208. In such manner the cams #1 and #2 are "phased" or coordinated in their operation of switches 178 and 208. Cam #1 has depressions which are designated a through m, each of these depressions being adapted to effect a closing of switch 178, which causes operation of starwheels 16 and momentary withdrawal of pusher plates 36 and 40. The successive depressions *a, b, c* and *d* have spacings of 21°36', or equivalent to a count of six shingles (six times 3°36') between each of these depressions. Between depressions *d* and *e* there is a greater spacing of 28°48', representing a count of eight shingles. The successive depressions *e, f, g* and *h* have spacings of 21°36' also, representing a count of six shingles each, and next there is a spacing of 28°43' between the depressions *h* and *i*, or a count of eight shingles each. The spacings between successive depressions *i, j* and *k* similarly are spaced for groups of six counts, and successive depressions *k, l* and *m* are spaced for counts of eight shingles each. Thus, the spacings of the depressions *a* through *m* determine the number of shingles in each group G, in that it determines how many shingles must pass each of the photorelays 8 to advance the cam #1 to a point wherein one of these depressions closes switch 178 to operate the starwheels 16. Between depressions *a* and *e* four groups of six, six, six and eight shingles will be dropped by the starwheels 16.

Referring to FIGURE 18, a depression *e'* on cam #2 is set to operate switch 208 on the same count that depression *e* operates switch 178. Thus, concurrently with the dropping of groups G in response to closing of switch 178 by depression *e*, switch 208 will close with respect to line 210 and relay CR1. While this is occurring, shingles will continue to be delivered on conveyer 4 and the counter shaft 180 will continue to be advanced so that switches 178 and 208 will quickly leave the cam depressions *e* and *e'*, respectively. The reopening of switch 178 will de-energize solenoid 202 and cause pusher plates 36 and 40 to move inwardly, squaring the newly deposited groups G, and immediately switch 208 will be closed with respect to line 216 and the now closed relay contacts CR1*b*, so that solenoid 204 will be energized to cause lowering of the drop plates 28. Thus the stacks S, each composed of the groups G of six, six, six and eight shingles, will be dropped onto the conveyer 46.

On cam #1 the depressions *e* through *i* again will cause four groups G of six, six, six and eight shingles to be dropped by each pair of starwheels 16. In phase with the depression *i* on cam #1, there is on cam #2 a depression *i'*. When the depression *i'* is encountered by switch 208 the operation just described is repeated, in that each stack S totaling 26 shingles will have its top group of eight shingles squared and then will be dropped onto the conveyer 46. As the counting advances from the depressions *i* through *m*, groups G of six, six, eight and eight shingles, or a total of 28, will be dropped by each pair of starwheels 16. In phase with depression *m* on cam #1 is a depression *m'* on cam #2 which causes lowering of the drop plates 28 and dropping of bundles of 28 shingles each onto the conveyer 46.

As the depressions *a* through *m* on cam #1 and depressions *a', e', i'* and *m'* on cam #2 serially operate their associated switches 178 and 208, three bundles of 26, 26 and 28 shingles, or a total of 80, will be assembled and dropped to the conveyer 46 by each of the units I, II and III. Concurrently with operation of these switches by depressions *m* and *m'*, cam 188 (FIGURE 16) reaches a position of engagement with switch actuator 192, thereby closing switch 176, which will reactivate the "sub" counter drive unit 158 through operation of switch 168 by relay coil 172. The counter will then reverse, and the depressions *a* through *m* and depressions *a', e', i'* and *m'* will in reverse order operate their associated switches 178 and 208 in the same manner as described above in connection with forward operation. During reverse operation, each of the units I, II and III assembles, squares and deposits on conveyer 46 three bundles of 28, 26 and 26 shingles, in that order. When depressions *a* and *a'* return to their home position wherein they operate their switches, the cam 188 concurrently will close switch 174 to reverse the counter back to forward operation through operation of the "add" counter drive unit 156.

It is significant to note that the depressions *a', e', i'* and *m'* do not cause the lowering of drop plates 28 until after the depressions *a, e, i* and *m* have caused the operation of starwheels 16 and a squaring operation by pusher plates 36 and 40. Fluid-operated unit 20 operates the starwheels 16 immediately upon the closing of switch 178, and fluid-operated units 34 and 42 also act immediately to withdraw pusher plates 36 and 40. Thereafter, the pusher plates will not be returned inwardly until the counter has been advanced by an increment representing one count or shingle, the switch 178 then having passed one of the depressions on cam #1 and been restored to its normal open position. Similarly, the solenoid 204 cannot be energized to effect lowering of drop plates 28 until the counter has advanced beyond the count representing one of the depressions in cam #2. In actual practice, the system is adjusted to cause a completion of the squaring function slightly in advance of the lowering of the drop plates 28 by fluid-operated units 32.

The operation of the conveyer 46 will now be described with reference to FIGURES 14 and 20. Conveyer 46 is is driven by a motor 224. Referring to FIGURE 14, each of the units I, II and III has a switch 146 which is actuated in response to lowering of drop plates 28, signaling the dropping of a bundle of shingles onto the conveyer 46. It is desired to operate the normally motionless conveyer 46 only after the dropping of three bundles B has been completed, and to this end the three switches 146 for these units are connected in series with the conveyer motor 224. Thus, motor 224 will operate only after the closing of all switches 146. It should be recognized, however, that FIGURE 20 represents only a simplified, schematic illustration of what is involved, and that more elaborate circuit elements well known to those skilled in the art are employed in practice.

In considering the cooperative operation of the three units I, II and III, the effect which the particular interconnection of the three photorelays 8 has on this operation will be reviewed here. The three sets of starwheels 16 always operate simultaneously, and the three sets of drop plates 28 also must operate simultaneously. The reason for this is that all of these units are controlled by the same counter mechanism. However, the counter cannot operate until the last of the photorelays 8 has detected the passing of the trailing edge of a shingle, for reasons previously explained. In practice, due mainly to the very high speeds at which shingles are traveling (at speeds in the range over 350 feet per minute), three shingles will not all pass the photorelays 8 in exact alignment nor arrive on the starwheels 16 at precisely the same time. Therefore, it is desirable to delay the operation of all three sets of starwheels 16 until the last of three shingles, i.e., the trailing shingle, has settled on the starwheels. To this end, the three photorelays 8 are connected in parallel as described, and the counter ratchet mechanism cannot step until each of the photorelay switches 181 has been opened in response to the passing of the trailing edge of a detected shingle.

It has been seen that the spacings of the depressions on cam #1 serve as a means for programming a predetermined selection of numbers of shingles in successively delivered groups G; the spacings of depressions on cam #2 serve as a means for programming a predetermined selection of numbers of groups G in successively formed stacks S prior to delivery as bundles B. Although the spacings of depressions *a* through *m* on cam #1 are such as to produce groups of six or eight shingles, these depressions can be arranged to produce groups G having any reasonable number of shingles therein. For practical purposes, however, in the handling of shingles the formation of groups of between four and nine is the most feasible. Although it is possible, it is not feasible to operate the starwheels and squaring pusher plates on rapidly moving groups of less than four each, except possibly in the case of handling very thick and heavy shingles. It is generally unsatisfactory to effect squaring operations on groups of greater than nine shingles because the weight of each group and the particular condition of the newly made shingles leads to the difficulties discussed in the introduction herein. Similarly, although the depressions on cam #2 are arranged to produce bundles of 26 or 28 shingles, they could be arranged to produce bundles in other numbers such as 20, 27 or 29. For example, by properly spacing and relating the depressions on cam #1 and cam #2, this machine might be operated to produce only bundles of 20 shingles each, with four groups of five shingles each going into each bundle, or three groups of seven, seven and six. The basic principles of this programming or predetermined selection have been explained, and the wide variety of possible combinations that can be built into this machine will be obvious in the light of this disclosure.

Although the present invention is intended to solve problems which are peculiar to the handling of shingles, it should be understood that the invention is broadly applicable to the stacking and squaring of other materials in situations where all or some of these or analogous problems are involved.

Various other departures from the specifically disclosed embodiment of the invention can be effected without departing from the scope of the invention as defined by the following claims.

We claim:

1. Apparatus for stacking and squaring shingles or the like comprising means for supporting a stack of shingles, squaring means operable to move the edges of shingles on said stack into approximate alignment, means above said stack supporting means for assembling groups of shingles depositing them on said stack including shelf means movable from beneath a said group to effect dropping thereof, control means for said squaring means, said control means being responsive to the placement of each said group on said stack to effect at least one operation of said squaring means, and means for removing a plurality of said groups constituting a completed stack.

2. Apparatus according to claim 1, wherein the last-mentioned means is responsive to the placement and squaring of a predetermined number of said groups to effect said removal thereof as a stack.

3. Apparatus according to claim 1, wherein said means for placing pre-assembled groups of shingles on said stack comprise a means for receiving and supporting shingles delivered thereto in superposed relation to form each said group and operable to deliver said groups individually to said stack-supporting means, means for delivering said shingles to the last-recited means in succession, means for detecting the completed delivery to the first-mentioned means herein of a predetermined plurality of shingles constituting one of said groups, and control means responsive to said detecting means for operating said first-mentioned means herein to cause delivery of the group to said stack-supporting means.

4. Apparatus according to claim 1, wherein said stack-supporting means is movable from beneath said stack to drop the same and effect said stack removal, and said last-mentioned means comprises means for moving said stack-supporting means from beneath said stack.

5. Apparatus for stacking and squaring shingles or the like comprising means providing a support adapted to receive shingles successively delivered thereto in superposed relation, a conveyor for rapidly delivering shingles in succession directly to said support, a stack-supporting means beneath said support, means operable to move said support from beneath said shingles to effect dropping thereof downwardly to said stack-supporting means, control means responsive to the delivery of a predetermined number of shingles to said support for operating the same to effect said dropping of said shingles as a group, squaring means associated with said stack-supporting means for moving the edges of shingles in said stack into substantial alignment, and control means for said squaring means effecting the operation thereof after said dropping of each of said groups.

6. Apparatus according to claim 5, wherein said stack supporting means and said stack removing means collectively comprise separate shelf-like supporting members normally extending horizontally inwardly toward each other at the same level and support means for said members adapted to move the same from a supporting position beneath said stack, to effect dropping of the stack, and thereafter to restore said members to their horizontal stack-supporting position.

7. Apparatus according to claim 5, wherein said squaring means includes upstanding members at all sides of said stack-supporting means, and means moving the members at opposite sides relatively inwardly toward said stack to engage the edges of shingles therein.

8. Apparatus according to claim 5, wherein said means providing said support comprises a pair of spaced assemblies rotatable about parallel, horizontal axes and having shelf-like members extending radially from said axes toward each other at the same elevation, said shelf-like members constituting said support adapted to receive said shingles, and means for rotating said assemblies to move said members arcuately downwardly from beneath shingles supported thereon.

9. Apparatus according to claim 8, wherein each of said assemblies comprises a plurality of said members extending outwardly from said axes along circumferentially spaced radii, the angular spacing of said members being within the range of 90 to 180 degrees.

10. Apparatus for stacking and squaring shingles or the like comprising means providing a support adapted to receive shingles successively delivered thereto in superposed relation and movable from beneath a group of shingles supported thereon to effect dropping of the group, means connected to said support and responsive to the delivery of each predetermined plurality of successively delivered shingles constituting a desired group to effect said movement from beneath the said group, means beneath the first-mentioned support providing a lower support adapted to receive groups of shingles dropped from said first-mentioned support and movable from beneath a stack of said groups to effect dropping of said stack, squaring means adjacent to said lower support for bringing the edges of shingles deposited thereon into substantial alignment, means connected to said lower support and responsive to the accumulation of a predetermined number of said groups on said lower support to effect said movement thereof from beneath said groups, control means for said squaring means causing operation thereof a plurality of times between successive operations of the last-mentioned means, and a conveyor beneath said lower support for removing stacks of shingles dropped therefrom.

11. Apparatus according to claim 10, wherein said first-mentioned support includes at least one member rotatable about a horizontal axis aligned with the direction of delivery of said shingles, and said lower support includes at least one member rotatable about an axis below and parallel to the last-mentioned axis, the rotation of the first and last-mentioned support members being effective to drop said groups and stacks, respectively.

12. Apparatus according to claim 10, including a means for detecting and counting the shingles delivered to said first-mentioned support, said responsive means connected to said first-mentioned and said lower supports, for operating said supports, being responsive to said detecting and counting means.

13. Apparatus for stacking and squaring shingles or the like comprising a pair of spaced, parallel and horizontal shafts defining axes of rotation, a plurality of stack-supporting plates mounted on each of said shafts and extending radially therefrom, the plates on each of said shafts having uniform angular spacing, a responsive drive assembly including means normally maintaining a set of said plates on opposite shafts in a horizontal position extending inwardly toward each other whereby they are adapted to receive and support a stack of said shingles, said assembly further including means for intermittently indexing said plates about said axes by an angular amount corresponding to said angular spacing of the plates and in a direction to lower said set of plates, thereby to drop said stack, while bringing another set of said plates into said position adapted to receive and support a stack of shingles, means for successively delivering shingles to each of said sets of plates in superposed relation thereon, means responsive to the delivering of a predetermined plurality of said shingles for operating said responsive drive assembly, and means positioned beneath said plates for receiving stacks of shingles dropped therefrom.

14. Apparatus according to claim 13, including means associated with the last-mentioned means for squaring said stacks of shingles.

15. Apparatus according to claim 14, wherein said squaring means is operative on each of said stacks as dropped successively, and including means responsive to the dropping and squaring of a plurality of said stacks in mutually stacked relation to remove the same.

16. Apparatus for stacking and squaring shingles or the like comprising a group assembling mechanism, a squaring mechanism, means for removing a stack of shingles from said squaring mechanism, said group assembling mechanism being adapted to receive shingles delivered thereto in superposed relation and including means for transferring a group of said shingles as a group to said squaring mechanism, means for delivering shingles to said assembling mechanism, a shingle detecting and counting device positioned along the path of delivery of shingles to said assembling mechanism, a control system including a programming means driven by said detecting and counting device and having a first and a second set of signal steps, said first set of steps being spaced at distances corresponding to predetermined counts of shingles representing groups in numbers individually smaller than a completed stack, and said second set of signal steps being spaced at distances each of which constitutes a predetermined multiple of one said group, means responsive to said first set of signal steps for operating said assemblying mechanism, means responsive to said second set of signal steps for operating said stack-removing mechanism, and means for operating said squaring means in time with the repetitive operations of said assembling mechanism.

17. Apparatus according to claim 16, wherein said programming means constitute cam means and switching mechanism operated by said cam means.

18. Apparatus according to claim 16, wherein each said group represents between 4 and 9 shingles.

19. Apparatus according to claim 16, wherein said multiple of said group produces a stack having a total number of shingles in the range from 20 through 28.

20. A method of continuously forming neatly squared stacks of shingles being delivered rapidly in succession from a conveyor line comprising the steps of catching shingles as they leave said line at a first location and holding them until a small group has been collected, dropping said group downwardly to a second location while continuing to receive shingles at said first location and without interrupting the delivery thereof from said line, continuing said catching of shingles and the dropping of groups thereof, supporting the successively dropped groups at said second location to form a stack consisting of a predetermined number of said groups, performing a squaring operation on said stack following the dropping of each said group thereon, dropping said stack to a third location after said predetermined number of groups of shingles has been deposited thereon and while one of said groups is being collected at said first location, continuing said dropping of stacks to said third location, and removing said stacks from said third location.

21. A method of forming neatly squared stacks of shingles being delivered rapidly in succession from a conveyor line comprising the steps of catching said shingles as they leave said line and collecting them repetitively in small groups at one location, transferring each of said small groups to a second location after it is formed but without interrupting said delivery of shingles, forming a stack of said groups at said second location, performing a squaring operation on said stack immediately after each said group is deposited thereon, and periodically removing a completed stack from said location while continuing the delivery of shingles to said first location.

22. Apparatus for stacking and squaring shingles or the like comprising plural pairs of spaced members adapted to support shingles delivered thereto in succession, means operable to move a pair of said members away from a shingle supporting position to drop a group of shingles downwardly while thereabove moving another pair of said members into position to support a plurality of shingles delivered thereafter, control means for periodically operating the last-mentioned means to effect cyclically the assembling of shingles as a group and the dropping thereof, a squaring mechanism directly beneath said members including a support for groups of shingles dropped thereby, means operating said squaring mechanism intermittently to align the edges of an upper group of shingles with the edges of lower groups previously deposited, and means associated with said mechanism for removing stacks of squared shingles.

23. Apparatus for stacking and squaring shingles or the like comprising a pair of spaced, parallel and horizontal shafts defining axes of rotation, a plurality of stack-supporting plates mounted on each of said shafts and extending radially therefrom, the plates on each of said shafts having uniform angular spacing, a responsive drive assembly including means normally maintaining a set of said plates on opposite shafts in a horizontal position extending inwardly toward each other whereby they are adapted to receive and support a stack of said shingles, a conveyor having its delivery end adjacent one end of said shafts and travelling in line therewith for delivering rectangular shingles lengthwise in succession onto a set of said plates in horizontal position, means responsive to the delivering of a predetermined plurality of shingles from said conveyor for operating said responsive drive assembly, and means positioned beneath said plates for receiving stacks of shingles dropped therefrom.

24. Apparatus for stacking and squaring shingles or the like comprising a group assembling mechanism, a squaring mechanism directly beneath said group assembling mechanism, means for removing a stack of shingles from said squaring mechanism, said group assembling mechanism being adapted to receive shingles delivered thereto in superposed relation and including means for dropping a plurality of said shingles as a group to transfer them to said squaring mechanism, means for delivering shingles to said assembling mechanism, a shingle detecting and counting device positioned along the path of delivery of shingles to said assembling mechanism, a control system including a programming means driven by said detecting and counting device and having a first and a second set of signal steps, said first set of steps being spaced at distances corresponding to predetermined counts of shingles representing groups in numbers individually smaller than a completed stack, and said second set of signal steps being spaced at distances each of which constitutes a predetermined multiple of one said group, means responsive to said first set of signal steps for operating said assembling mechanism, means responsive to said second set of signal steps for operating said stack-removing mechanism, and means for operating said squaring means in time with the repetitive operations of said assembling mechanism.

References Cited by the Examiner
UNITED STATES PATENTS

| | | | |
|---|---|---|---|
| 2,393,254 | 1/46 | Leifer | 271—89 X |
| 2,424,093 | 7/47 | Harred | 93—93.3 |
| 2,723,606 | 11/55 | Brockhardt et al. | 93—93.3 |
| 2,772,612 | 12/56 | Feick et al. | 93—93.3 |
| 2,813,637 | 11/57 | Perry et al. | 93—93.3 X |

FRANK E. BAILEY, *Primary Examiner.*

BERNARD STICKNEY, *Examiner.*